(12) United States Patent
Frantz

(10) Patent No.: US 7,429,287 B2
(45) Date of Patent: Sep. 30, 2008

(54) HIGH EFFICIENCY GAS SWEETENING SYSTEM AND METHOD

(75) Inventor: Stephen R. Frantz, Richmond, TX (US)

(73) Assignee: BP Corporation North America Inc., Warrenville, IL (US)

( * ) Notice: Subject to any disclaimer, the term of this patent is extended or adjusted under 35 U.S.C. 154(b) by 407 days.

(21) Appl. No.: 11/138,049

(22) Filed: May 26, 2005

(65) Prior Publication Data
US 2006/0042463 A1      Mar. 2, 2006

Related U.S. Application Data

(60) Provisional application No. 60/605,895, filed on Aug. 31, 2004.

(51) Int. Cl.
*B01D 53/22* (2006.01)
(52) U.S. Cl. .................. 95/49; 95/47; 95/50; 95/51; 96/7; 96/9; 96/12
(58) Field of Classification Search ............... 95/45, 95/47, 49, 51, 52, 50; 96/4, 7, 9, 12
See application file for complete search history.

(56) References Cited

U.S. PATENT DOCUMENTS

| | | |
|---|---|---|
| RE29,428 E | 10/1977 | Homberg et al. |
| 4,130,403 A * | 12/1978 | Cooley et al. ................ 95/49 |
| 4,370,150 A | 1/1983 | Fensterrmaker |
| 4,466,946 A | 8/1984 | Goddin, Jr. et al. |
| 4,529,411 A | 7/1985 | Goddin, Jr. et al. |
| 4,561,864 A | 12/1985 | Klass et al. |
| 4,639,257 A | 1/1987 | Duckett et al. |
| 4,857,078 A * | 8/1989 | Watler ........................ 95/50 |

(Continued)

OTHER PUBLICATIONS

Spillman, Robert W. et al., "Experience with Membrane-Based Natural Gas Treating", Laurance-Reid Gas Conditioning Conference, Norman, Oklahoma, Mar. 1989.*

(Continued)

*Primary Examiner*—Jason M Greene
(74) *Attorney, Agent, or Firm*—John L. Wood

(57) ABSTRACT

Disclosed are a method and system for sweetening a raw natural gas feed stream using a multi-stage membrane separation process, and in embodiments a two-stage membrane separation process. The method and system also include use of a gas turbine which operates with an impure fuel gas stream (such as in the sense of having a relatively high $CO_2$ and $H_2S$ acid gas contaminant content) as derived from a permeate gas stream obtained in at least the second stage of a membrane separation process, or later stages if more than two stages are employed. In embodiments, the gas turbine is coupled with an electrical generator, which generates electrical power that drives a compressor for the second stage (or higher) of the membrane separation process, as well as other process equipment associated therewith, such as air coolers and process pumps. Alternatively, the gas turbine can be coupled mechanically to the compressor employed. In other embodiments, the power generated by the turbine generator combination can be exported to a local power grid. In other embodiments, the turbine generator is a micro-turbine generator (MTG) which can advantageously be used in applications where space is limited, such as an offshore platform or other oil/gas production facility or on board a floating vessel.

21 Claims, 1 Drawing Sheet

U.S. PATENT DOCUMENTS

| | | | |
|---|---|---|---|
| 4,963,165 | A | 10/1990 | Blume et al. |
| 5,256,295 | A | 10/1993 | Baker et al. |
| 5,256,296 | A | 10/1993 | Baker et al. |
| 5,401,300 | A | 3/1995 | Lokhandwala et al. |
| 5,407,466 | A | 4/1995 | Lokhandwala et al. |
| 5,407,467 | A | 4/1995 | Lokhandwala et al. |
| 5,669,958 | A | 9/1997 | Baker et al. |
| 5,873,928 | A * | 2/1999 | Callahan ................ 95/51 |
| 6,035,641 | A | 3/2000 | Lokhandwala |
| 6,053,965 | A | 4/2000 | Lokhandwala |
| 6,128,919 | A * | 10/2000 | Daus et al. ............. 95/51 |
| 6,161,386 | A * | 12/2000 | Lokhandwala ........... 95/50 |
| 6,298,652 | B1 | 10/2001 | Mittricker et al. |
| 6,630,011 | B1 * | 10/2003 | Baker et al. ............ 95/47 |
| 6,648,944 | B1 * | 11/2003 | Baker et al. ............ 95/51 |
| 6,684,644 | B2 | 2/2004 | Mittricker et al. |

OTHER PUBLICATIONS

Pruitt, "Mineral Terms—Some Problems in Their Use and Definition," Rocky Mt. Min L. Rev. 1, 16 (1966).

Spillman et al., "Experience With Membrane-Based natural Gas Treating", Lawrence Reid Gas Conditioning Conference, Norman, Oklahoma, Mar. 7, 1989.

\* cited by examiner

HIGH EFFICIENCY GAS SWEETENING SYSTEM AND METHOD

RELATED APPLICATIONS

This application is entitled to and hereby claims benefit of the filing date for U.S. Provisional Application Ser. No. 60/605,895, filed Aug. 31, 2004.

FIELD OF THE INVENTION

The present invention is directed to a method and system for sweetening sour gas streams and particularly sour gas streams comprising methane, such as natural gas, and also to a method and system for more efficient production of sweetened gas from such gas streams.

BACKGROUND OF THE INVENTION

Natural gas generally refers to rarefied or gaseous hydrocarbons (comprised of methane and light hydrocarbons such as ethane, propane, butane, and the like) which are found in the earth. Non-combustible gases occurring in the earth, such as carbon dioxide, helium and nitrogen are generally referred to by their proper chemical names. Often, however, non-combustible gases are found in combination with combustible gases and the mixture is referred to generally as "natural gas" without any attempt to distinguish between combustible and non-combustible gases. See Pruitt, "Mineral Terms-Some Problems in Their Use and Definition," Rocky Mt. Min. L. Rev. 1, 16 (1966).

For most markets, it is also desirable to minimize the presence of non-combustibles and contaminants in the product gas, such as carbon dioxide, helium, nitrogen and hydrogen sulfide. Depending on the quality of a given natural gas reservoir (which may contain as much as 50% to 70% carbon dioxide), the natural gas may be pre-processed at a natural gas plant for pre-removal of such of the above components.

Natural gas is widely recognized as the most important fuel gas in the United States and it provides more than one-fifth of all the primary energy used in the United States. Natural gas is also used extensively as a basic raw material in the petro-chemical and other chemical process industries.

The composition of natural gas varies widely from field to field where it is produced from subterranean reservoirs. For example, a raw gas stream may contain as much as 95% methane, with only minor amounts of other hydrocarbons, nitrogen, carbon dioxide, hydrogen sulfide or water vapor. On the other hand, raw gas streams that contain relatively large proportions of heavier hydrocarbons and/or other contaminants are common. Before the raw gas can be sent to a supply and/or transportation pipeline, it must usually be treated to remove at least a portion of one or more of these contaminants.

For example, in some reservoirs, wellhead gas can contain high enough percentages of $CO_2$ and $H_2S$ (acid gas) that the gas cannot be sold. Historically, amine plants have been utilized to sweeten the gas to meet pipeline specifications, using methods such as those disclosed for example in U.S. Reissue Pat. No. 29,428. Amine plants are large, heavy, and require significant supplies of outside electricity and de-ionized water. In addition, they generate an acid gas waste stream that typically must be supplemented with valuable fuel gas for flaring. This can also result in release of significant quantities of so-called "greenhouse gases" such as carbon oxides.

As an alternative to amine plants, membranes have been used for acid gas and other contaminant removal (such as nitrogen and other non-condensable gases), as well as higher hydrocarbons such as $C_{3+}$, with limited success over the past twenty years or so. For example the problem of upgrading raw gas in the field, such as to sweeten sour gas, is described in U.S. Pat. No. 4,370,150, to Fenstermaker, the teachings of which are incorporated herein by reference. In this patent, the patentee describes a process that uses a membrane, selective for hydrogen sulfide and/or heavier hydrocarbons over methane, to treat a side stream of raw gas. The process is said to produce a membrane residue stream of fuel quality. The contaminants pass preferentially through the membrane to form a low-pressure permeate stream, which is returned to the main gas line upstream of the field compressor.

Membranes selective for removal of acid gas components ($CO_2$) from gas streams, including methane, are disclosed in U.S. Pat. No. 4,963,165. Use of membrane technology for removal of acid gases is also generally disclosed in U.S. Pat. Nos. 4,466,946; 4,529,411; 4,561,864; 4,639,257; 5,256,296; 5,401,300; 5,407,466; 5,407,467; 6,053,965; and 6,161,386. The removal of nitrogen contaminant from natural gas by use of membranes is disclosed in U.S. Pat. Nos. 5,669,958 and 6,035,641. Use of membranes for removal of $C_{3+}$ hydrocarbons from natural gas streams is also disclosed in U.S. Pat. No. 6,161,386. A two-stage membrane separation process is disclosed in U.S. Pat. No. 5,256,295. The teachings of each of the foregoing patents are incorporated herein by reference in their entirety.

As the raw gas stream travels from the wellhead to a gas processing plant and ultimately to a pipeline, gas generally passes through compressors or other field equipment. These units require power to operate, and it would be desirable to run them using gas engines fired by natural gas derived from the field. A related operation is to use such natural gas as combustion fuel for turbines, which are then used to drive other equipment, for example, electric power generators and compressors. However, since the field gas has not yet been brought to specification, however, this practice may expose the engine to fuel that is of overly high Btu value, low octane number, or corrosive. Also it would be desirable to not use natural gas from which contaminants have been removed, i.e., pipeline gas, as it has more value in the marketplace. In these cases, the water and hydrocarbon dewpoints of the gas should be below the lowest temperature likely to be encountered en route to the turbine. If this is not done, the feed stream may contain entrained liquid water and hydrocarbons. These do not burn completely when introduced into the turbine firing chamber, and can lead to nozzle flow distribution problems, collection of liquid pools and other reliability issues. Additionally high concentrations of heavy hydrocarbons tend to make the fuel burn poorly, resulting in coke formation and deposition of carbon in the fuel pathways and on the turbine blades. These deposits reduce turbine performance and affect reliability.

A number of patents mention treatment of raw natural gas for purposes of obtaining fuel gas that may be used as fuel in gas turbines for electric power generation. For example, U.S. Pat. Nos. 6,053,965 and 6,161,386 disclose use of a separation membrane to upgrade raw natural gas to run field engines and generate electrical power therefrom. Similar processes are disclosed in U.S. Pat. Nos. 6,298,652 and 6,684,644. U.S. Pat. No. 6,035,641 discloses use of a membrane to upgrade gas containing large amounts of nitrogen, followed by use of that gas as combustion fuel for a turbine that generates electric power. The patents referenced hereinabove are also incorporated herein by reference in their entirety.

While process equipment employing membranes can be more compact than amine plants and has been disclosed as a means to upgrade raw natural gas, as previously mentioned herein, such separation membranes are frequently subject to a number of undesirable characteristics, the most significant of which relate to relatively large methane losses and greenhouse emissions from disposal of the permeate gas. These characteristics result in a process that in many cases is inefficient and uneconomical.

As can be seen, it would be desirable to develop a gas sweetening method and system which can more effectively remove undesirable contaminants from natural gas streams without the large capital, electrical power, and water requirements of an amine plant, or the undesirable methane losses and high emissions of greenhouse gases into the environment that are associated with conventional membrane separation processes.

SUMMARY OF THE INVENTION

The foregoing objects and advantages may be attained in accordance with the present invention, which in one aspect relates to a method for sweetening a raw natural gas feed stream by removing undesired contaminants therein selected from acid gases, non-combustibles, and mixtures thereof, to produce a sweetened natural gas stream. The method comprises the steps of:

(a) contacting the raw natural gas feed stream with a first stage separation membrane to obtain a sweetened natural gas product stream rich in methane and reduced in contaminant content relative to the raw natural gas stream, and a first stage permeate gas stream comprised of methane and having a contaminant content which is greater than that of the raw natural gas stream;

(b) compressing the first stage permeate gas stream to provide a compressed first stage permeate gas stream;

(c) contacting the compressed first stage permeate gas stream with a second stage separation membrane to obtain a recycle gas stream and a second stage permeate gas stream;

(d) directing the recycle gas stream to be combined with the raw natural gas feed stream at any point prior to being contacted with the first stage separation membrane; and (e) directing the second stage permeate gas stream to be used as a fuel gas for a gas turbine that combusts the second stage permeate gas stream and thereby generates mechanical work.

In other embodiments, the invention relates to a method for sweetening a raw natural gas feed stream by removing undesired acid gases selected from $CO_2$ and $H_2S$ to produce a sweetened natural gas stream having reduced levels of such acid gases therein. The method comprises the steps of:

(a) contacting the raw natural gas feed stream with a first stage separation membrane selectively permeable to acid gas contaminants so as to obtain a sweetened natural gas product stream rich in methane and reduced in acid gas contaminant content relative to the raw natural gas stream, and a first stage permeate gas stream comprised of methane and having an acid gas contaminant content which is greater than that of the raw natural gas stream;

(b) compressing the first stage permeate gas to provide a compressed first stage permeate gas stream;

(c) contacting the compressed first stage permeate gas stream with a second stage separation membrane selectively permeable to acid gas contaminants so as to obtain a recycle gas stream and a second stage permeate gas stream;

(d) directing the recycle gas stream to be combined with the raw natural gas feed stream at any point prior to being contacted with the first stage separation membrane; and (e) directing the second stage permeate gas stream to be used as a fuel gas for a gas turbine that combusts the second stage permeate gas stream and thereby generates mechanical work.

In another aspect, the invention relates to a system for sweetening a raw natural gas feed stream by removing undesired contaminants therein selected from acid gases, non-combustibles, or mixtures thereof to produce a sweetened natural gas product stream. The system comprises:

(a) a first stage separation membrane unit having a raw gas feed inlet, a feed gas side of the unit fluidly connected to the raw feed gas inlet, a sweetened natural gas product outlet fluidly connected to the feed gas side, a permeate gas side of the unit, a first separation membrane dividing the raw feed gas side from the permeate gas side, and a permeate gas outlet fluidly connected to the permeate gas side of the unit;

(b) a permeate gas compressor which is fluidly connected with the permeate gas outlet of the first separation membrane unit and having a compressed permeate gas outlet;

(c) a second stage separation membrane unit having a compressed permeate gas inlet fluidly connected to the compressed permeate gas outlet of the permeate gas compressor, a compressed permeate gas side of the unit, a recycle gas outlet fluidly connected to the compressed permeate gas side and fluidly connected to the raw gas feed inlet of the first stage membrane separation unit, a second permeate gas side of the unit, a second separation membrane dividing the compressed permeate gas side from the second permeate gas side, and a second permeate gas outlet fluidly connected to the second permeate gas side; and (d) a gas turbine unit comprised of a combustion chamber fluidly connected with the second permeate gas outlet of the second stage membrane separation unit and said combustion chamber also fluidly connected to a source of an oxidant for combusting a fuel gas stream conveyed from the second permeate gas outlet, the gas turbine unit also comprising a shaft coupled to the turbine unit for purposes of generating mechanical work.

In some embodiments, the gas turbine unit is mechanically coupled to an electrical generator for purposes of generating electrical power, which in preferred embodiments, is used to drive the permeate gas compressor. In other embodiments, the turbine unit may be mechanically coupled to a drive shaft for the permeate gas compressor, such that mechanical power is used to drive such compressor.

DETAILED DESCRIPTION OF THE INVENTION

Figure 1:
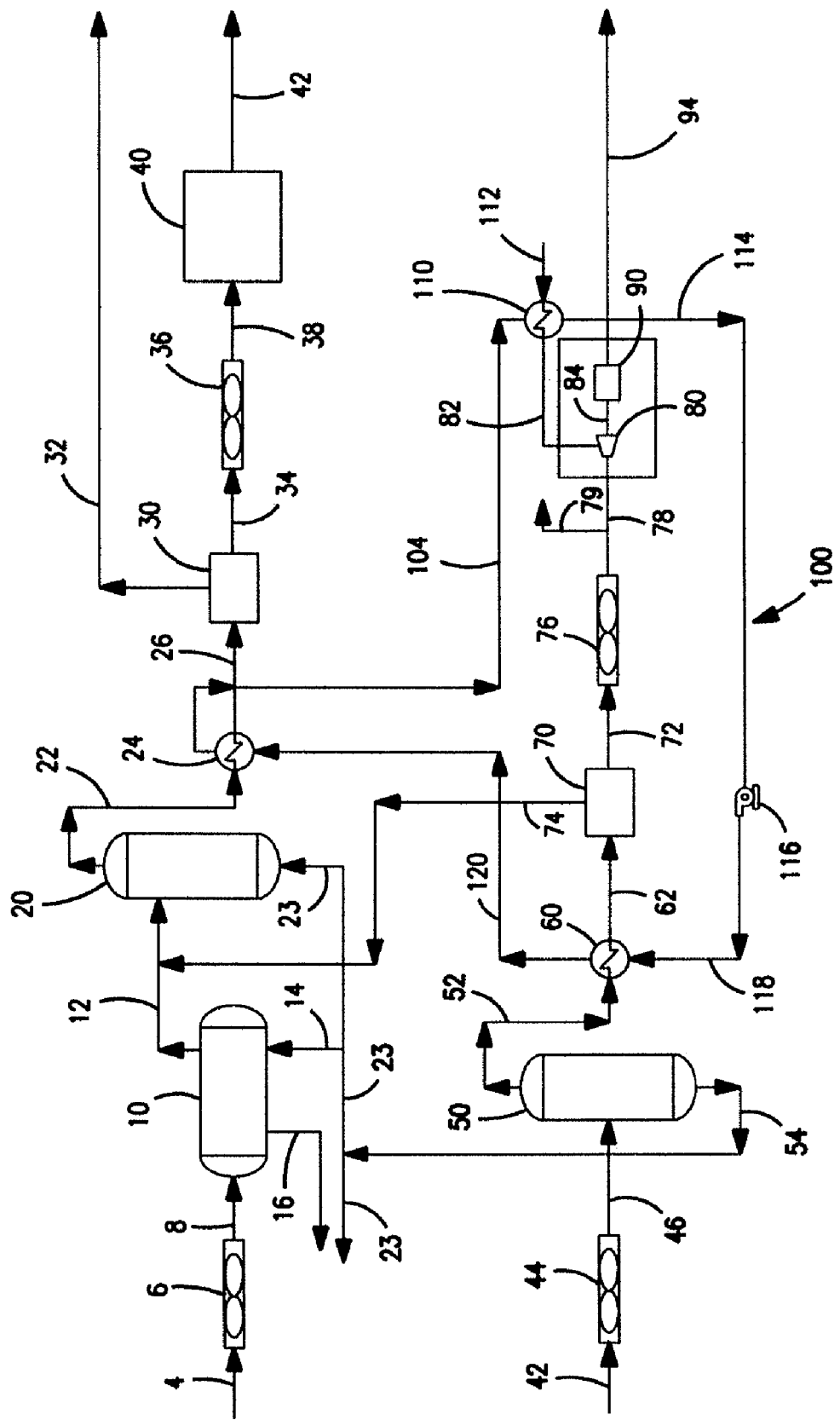
FIG. 1 is a simplified process flow diagram of an embodiment of the high efficiency gas sweetening system and method as disclosed herein.

The raw natural gas contemplated for use herein generally comprises at least 50 mole percent methane, preferably at least 75 mole percent methane, and more preferably at least 90 mole percent methane for best results. The balance of natural gas generally comprises other combustible hydrocarbons such as, but not limited to, lesser amounts of ethane, propane, butane, pentane, and heavier hydrocarbons and non-combustible components such as carbon dioxide, hydrogen sulfide, helium and nitrogen.

The presence of heavier hydrocarbons such as ethane, propane, butane, pentane, and hydrocarbon boiling at a boiling point above propane is generally reduced in the natural gas through gas-liquid separation steps. Hydrocarbon boiling at a temperature above the boiling point of pentane or hexane is generally directed to crude oil. Hydrocarbon boiling substantially at a temperature above the boiling point of ethane and below the boiling point of pentane or hexane is generally removed and considered to be natural gas liquids or "NGLs" for purposes of the present invention. It is preferred that such NGL's be removed from the raw natural gas prior to being used in the present method or system. The natural gas processed in accordance with the processing steps of the present invention is therefore preferably of a composition such that it may be directed for the manufacture of natural gas pipeline gas without requiring additional processing steps for removal of NGLs.

The present invention is directed to a method and system for sweetening gas which utilizes a multi-stage separation membrane process and in some embodiments a turbine generator combination to attain an overall process which is highly efficient relative to the membrane systems and methods previously known in the art, and which method also has reduced methane losses and lower emissions of greenhouse gases. To reduce methane losses, a multi-stage process (preferably a two-stage process due to lower capital requirements) is utilized, and in some embodiments, fuel gas required to operate the second stage permeate gas compressor as described hereinafter is obtained by use of at least a portion of the permeate gas stream from the first membrane separation stage as the fuel gas.

The method and system are illustrated by FIG. 1 and comprises a multi-stage contaminant separation process. For the embodiment shown in the figure, the method and system are depicted as a two-stage membrane process, that employs gas sweetening membranes 30 and 70, an electric-drive gas compressor 40, a turbine generator combination (preferably a micro-turbine generator combination ("MTG")) as shown as 80 and 90 in shaft-coupled orientation, and associated vessels and heat exchangers and related piping.

Feed gas (typically at a pressure of 1000-1200 psig) flows through line 4 and it may be subject to pre-treatment steps to remove particulate contaminants (solids and/or entrained liquid droplets, such as water or heavier hydrocarbons) according to known methods in the art (which can include use of a filter separator vessel 20 as shown in FIG. 1) and is also cooled by an air-cooled heat exchanger 6 to lower the feed gas temperature to from about 100 to 120° F. so that condensable components, such as water and heavier hydrocarbons may condense and be removed from the feed gas stream. Such feed gas as produced from a formation may be at elevated temperatures, such as up to about 250° F. or higher. Feed gas is conveyed by line 8 to a typical production fluid separator 10 wherein a natural gas stream comprised of methane and a minor portion of $C_{2+}$ hydrocarbons (ethane, propane, and butane) together with contaminants (acid gas, non-condensables, and water vapor) as previously mentioned exits via line 12. A stream of heavier hydrocarbons ($C_{5+}$) is recovered and exits production fluid separator 10 by line 16 and a stream of condensed water exits via line 14. The natural gas stream is conveyed by line 12 to a filter separator 20 as known in the art wherein water is removed by line 23 and other particulate solids can also be removed, and a further dehydrated natural gas stream 22 is obtained and then conveyed to heat exchanger 24. Heat exchanger 24 adjusts the temperature of the dehydrated natural gas stream 22 to a temperature of from about 20-70° F. above the gas dew point for the natural gas stream in line 22. Heat exchanger 24 utilizes a waste heat transfer fluid stream 120 which is described in more detail below in reference to waste heat recovery loop 100.

The dehydrated natural gas stream exits heat exchanger 24 via line 26 and then enters the first stage membrane separator 30 for acid gas or other contaminant removal and exits the first stage membrane separator 30 via line 32 as sales (product) gas. Membranes selective for acid gas removal and recovery, as well as other contaminants such as nitrogen and other non-condensables, are known and described for example in the patents previously incorporated herein by reference, and in particular, the cellulose acetate and polyimide membranes as described in U.S. Pat. Nos. 4,370,150 and 4,963,165, which may be in a hollow tube or spiral wound configuration. The first stage permeate stream 34 exits the first stage membrane separator 30 at a relatively low pressure (40-60 psig) and with a relatively high methane content (60-80 mole %) relative to the feed gas. Line 34 directs the permeate stream to an air cooled heat exchanger 36 which adjusts the temperature to about 100 to 120° F. to facilitate removal of condensable liquids therein (not shown) prior to being directed via line 38 to permeate compressor 40.

The first stage permeate gas stream in lines 34 and 38 is recompressed in an electric-drive gas permeate compressor 40 (which may be a reciprocating, centrifugal, or rotary compressor) to a relatively high pressure of 1000-1200 psig. The permeate gas stream is directed by line 42 to an air-cooled heat exchanger 44 and again cooled to a temperature of about 100 to 120° F. and then conveyed by line 46 to a filter separator 50 to again remove any free liquids (water) via line 54. The water or other condensed liquids in line 54 are directed to line 23 for combination therewith and then directed to suitable waste water processing (not shown). The dehydrated permeate gas stream exits separator 50 via line 52 and is then directed to heat exchanger 60 where it is reheated to about 20-70° F. above the gas dew point. Heat exchanger 60 utilizes a waste heat transfer fluid stream 118 as described in more detail below in reference to waste heat recovery loop 100.

The first stage gas permeate exits heat exchanger 60 via line 62 and is directed to a second stage membrane separator 70 where a sweetened gas recycle stream (methane content generally higher than that of the first stage gas permeate) is recovered by line 74 and recycled back to line 12 (for example) for combination with the natural gas stream being processed therein and ultimately directed to the first stage membrane separator 30. A second stage permeate gas exits second stage membrane separator 70 via line 72 (at a pressure of from 100-120 psig and methane content (about 30-50 mole %) and is utilized as a fuel gas for a gas turbine generator unit, preferably a micro-turbine generator (MTG) as described hereinafter. Initially, the second stage permeate gas is directed to an air cooled heat exchanger 76 wherein the gas stream is adjusted to a temperature of about 100 to 120° F. for removal of any condensable liquids (not shown) and the fuel gas stream is conveyed to the MTG via line 78. A vent stream 79 is shown for purposes of venting any excess fuel gas over what can be handled by the turbine 80.

The gas turbine generator unit comprises in a preferred embodiment, a micro-turbine 80 (MTG) which is shaft-coupled via a mechanical drive shaft 84 to an electrical power generator 90. The micro-turbine 80 combusts the second stage permeate gas stream conveyed by line 78 in a highly efficient, low carbon oxide emissions manner. Micro-turbine generators have recently been introduced by Ingersoll Rand Corporation of Davidson, N.C. and Capstone Company of Chatsworth, Calif., such as Model MT 250 (250 kW rating) from Ingersoll Rand and Models C30 and C60 from Capstone (ratings of 30 kW and 60 kW respectively) to generate electricity in a highly efficient manner from low pressure, low BTU fuel gas streams, while producing minimal emissions of greenhouse gases. In general, the micro-turbine generators can be obtained in a size of 250 kW or less, which makes then highly compact and therefore suitable for use in applications where space is limited, such as an offshore gas/oil production platform or facility, or on a ship or other vessel. Electrical power generated by electrical generator 90 is conveyed by electrical line 94 for use in the process, such as the permeate compressor 40, and in other embodiments it may be used for example to operate other process equipment, such as any one or more of the air coolers previously mentioned, or the waste heat fluid pump 116 as described below. If desired, all of or at least a portion of the electrical power in line 94 may also be exported for sale to a local power grid (not shown). Alternatively, the gas turbine employed may be mechanically coupled to the permeate gas compressor so that the mechanical work generated by the gas turbine is used to drive the permeate gas compressor.

The MTG exhaust stream exits micro-turbine 80 via a line 82 and is directed to a waste heat recovery loop 100 as generally shown in FIG. 1. In the embodiment shown, waste heat in exhaust stream 82 is recovered by use of heat exchanger 110. In the heat exchanger 110, the waste heat in exhaust stream 82 is transferred by indirect heat exchange into a waste heat transfer fluid medium that is conveyed by lines 104 and 114 into/out of heat exchanger 110 respectively. The waste heat transfer fluid may be any heat exchange fluid media known in the art, such as a glycol or other heat transfer fluid capable of handling heat transfer from the turbine exhaust stream, which can be at a temperature of as high as 500° F. and above. This fluid is used for pre-heating of the membrane feed streams as shown by waste heat recovery loop 100 in FIG. 1. The waste heat transfer fluid is circulated throughout waste heat recovery loop 100 by waste heat transfer fluid pump 116 which supplies heat exchangers 60, 24 and 110 with the waste heat transfer fluid via lines 118, 120, 104, and 114 respectively.

The method and system disclosed hereinabove combines the benefits of separation membranes, preferably acid gas separation membranes, with the efficiency of gas turbines, such as a micro-turbine, to create a method and system that can sweeten gas with reduced greenhouse gas emissions and maximum efficiency.

Other embodiments and benefits of the invention will be apparent to those skilled in the art from a consideration of this specification or from practice of the invention disclosed herein. It is intended that this specification be considered as exemplary only with the true scope and spirit of the invention being indicated by the following claims.

What is claimed is:

1. A method for sweetening a raw natural gas feed stream by removing undesired contaminants selected from acid gases, non-combustibles, or mixtures thereof to produce a sweetened natural gas stream, the method comprising:
   (a) contacting the raw natural gas feed stream with a first stage separation membrane to obtain a sweetened natural gas product stream rich in methane and reduced in contaminant content relative to the raw natural gas stream, and a first stage permeate gas stream comprised of methane and having a contaminant content which is greater than that of the raw natural gas stream;
   (b) compressing the first stage permeate gas stream to provide a compressed first stage permeate gas stream;
   (c) contacting the compressed first stage permeate gas stream with a second stage separation membrane to obtain a recycle gas stream and a second stage permeate gas stream;
   (d) directing the recycle gas stream to be combined with the raw natural gas feed stream at any point prior to being contacted with the first stage separation membrane; and
   (e) directing the second stage permeate gas stream to be used as a fuel gas for a gas turbine that combusts the second stage permeate gas stream and thereby generates mechanical work.

2. The method of claim 1 wherein steps (b) and (c) are repeated at least once.

3. The method of claim 1 wherein the separation membranes employed are selectively permeable for acid gases selected from $CO_2$, $H_2S$, and mixtures thereof.

4. The method of claim 1 wherein the gas turbine is coupled to an electrical generator to produce electrical power.

5. The method of claim 4 wherein at least a portion of the electrical power is used to drive a compressor for step (b).

6. The method of claim 4 wherein at least a portion of the electrical power is used to drive other process equipment.

7. The method of claim 4 wherein at least a portion of the electrical power is exported for sale to a local power grid.

8. The method of claim 1 wherein the separation membranes employed are selectively permeable for nitrogen.

9. The method of claim 1 wherein the method is conducted offshore on a production platform or vessel.

10. A method for sweetening a raw natural gas feed stream by removing undesired acid gases selected from $CO_2$ and $H_2S$ to produce a sweetened natural gas stream having reduced levels of such acid gases therein, the method comprising:
    (a) contacting the raw natural gas feed stream with a first stage separation membrane selectively permeable to acid gas contaminants so as to obtain a sweetened natural gas product stream rich in methane and reduced in acid gas contaminant content relative to the raw natural gas stream, and a first stage permeate gas stream comprised of methane and having an acid gas contaminant content which is greater than that of the raw natural gas stream;
    (b) compressing the first stage permeate gas to provide a compressed first stage permeate gas stream;
    (c) contacting the compressed first stage permeate gas stream with a second stage separation membrane selectively permeable to acid gas contaminants so as to obtain a recycle gas stream and a second stage permeate gas stream;
    (d) directing the recycle gas stream to be combined with the raw natural gas feed stream at any point prior to being contacted with the first stage separation membrane; and
    (e) directing the second stage permeate gas stream to be used as a fuel gas for a gas turbine that combusts the second stage permeate gas stream and thereby generates mechanical work.

11. The method of claim 10 wherein steps (b) and (c) are repeated at least once.

12. The method of claim 10 wherein the gas turbine is coupled to an electrical generator to produce electrical power.

13. The method of claim 12 wherein at least a portion of the electrical power is used to drive a compressor for step (b).

14. The method of claim 12 wherein at least a portion of the electrical power is used to drive other process equipment.

15. The method of claim 12 wherein at least a portion of the electrical power is exported for sale to a local power grid.

16. The method of claim 10 wherein the method is conducted offshore on a production platform or vessel.

17. A system for sweetening a raw natural gas feed stream by removing undesired contaminants therein selected from acid gases, non-combustibles, or mixtures thereof to produce a sweetened natural gas product stream, the system comprising:

(a) a first stage separation membrane unit having a raw gas feed inlet, a feed gas side of the unit fluidly connected to the raw feed gas inlet, a sweetened natural gas product outlet fluidly connected to the feed gas side, a permeate gas side of the unit, a first separation membrane dividing the raw feed gas side from the permeate gas side, and a permeate gas outlet fluidly connected to the permeate gas side of the unit;

(b) a permeate gas compressor which is fluidly connected with the permeate gas outlet of the first separation membrane unit and having a compressed permeate gas outlet;

(c) a second stage separation membrane unit having a compressed permeate gas inlet fluidly connected to the compressed permeate gas outlet of the permeate gas compressor, a compressed permeate gas side of the unit, a recycle gas outlet fluidly connected to the compressed permeate gas side and fluidly connected to the raw gas feed inlet of the first stage membrane separation unit, a second permeate gas side of the unit, a second separation membrane dividing the compressed permeate gas side from the second permeate gas side, and a second permeate gas outlet fluidly connected to the second permeate gas side; and (d) a gas turbine unit comprised of a combustion chamber fluidly connected with the second permeate gas outlet of the second stage membrane separation unit and said combustion chamber also fluidly connected to a source of an oxidant for corn busting a fuel gas stream conveyed from the second permeate gas outlet, the gas turbine unit also comprising a shaft coupled to the turbine unit for purposes of generating mechanical work.

18. The system of claim 17 wherein the shaft of the gas turbine unit is coupled to an electric generator.

19. The system of claim 18 wherein the gas turbine and electric generator comprise a micro-turbine generator unit (MTG).

20. The system of claim 18 or 19 wherein an electrical line is connected from the electric generator to the permeate gas compressor so that electrical power from the electrical generator is used to power the permeate gas compressor.

21. The system of claim 17 wherein the shaft of the gas turbine unit is coupled to a drive shaft for the permeate gas compressor such that mechanical work from the gas turbine unit is used to drive the permeate gas compressor.

\* \* \* \* \*